US 6,628,482 B2

(12) United States Patent
Hong et al.

(10) Patent No.: US 6,628,482 B2
(45) Date of Patent: Sep. 30, 2003

(54) CRASH STOP ASSEMBLY IN A DISC DRIVE

(75) Inventors: Yiren Hong, Singapore (SG); Tak Koon Ooi, Singapore (SG); Mo Xu, Singapore (SG); ChorShan Cheng, Singapore (SG); CheeWai SeeToh, Singapore (SG); YongJie Tang, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 91 days.

(21) Appl. No.: 10/043,691

(22) Filed: Jan. 10, 2002

(65) Prior Publication Data

US 2003/0039076 A1 Feb. 27, 2003

Related U.S. Application Data

(60) Provisional application No. 60/314,387, filed on Aug. 23, 2001.

(51) Int. Cl.[7] .................................................. G11B 5/55
(52) U.S. Cl. .................................................. 360/265.1
(58) Field of Search ........................................ 360/265.1

(56) References Cited

U.S. PATENT DOCUMENTS

| 5,109,310 | A | * | 4/1992 | Ohkjita et al. ........... 360/265.1 |
| 5,365,389 | A | | 11/1994 | Jabbari et al. |
| 5,600,516 | A | | 2/1997 | Phillips et al. |
| 5,745,325 | A | | 4/1998 | Matsumoto |
| 5,764,436 | A | | 6/1998 | Ngo et al. |
| 5,870,264 | A | | 2/1999 | Restle |
| 6,125,017 | A | | 9/2000 | Misso et al. |
| 6,134,086 | A | | 10/2000 | Kim |
| 6,252,745 | B1 | | 6/2001 | McReynolds et al. |

* cited by examiner

Primary Examiner—Robert S. Tupper
(74) Attorney, Agent, or Firm—Merchant & Gould P.C.

(57) ABSTRACT

A crash stop assembly limits pivotal movement of an actuator assembly mounted on a base plate of a disc drive. The disc drive includes a signal channel extending from the actuator assembly to a disc drive circuit board, and the crash stop assembly includes a connector bracket secured to the base plate and supporting the signal channel. The crash stop assembly further includes a crash stop secured to the connector bracket and extending therefrom, and the crash stop includes a contact surface that contacts the actuator assembly to limit pivotal movement of the actuator assembly.

22 Claims, 5 Drawing Sheets

CRASH STOP ASSEMBLY IN A DISC DRIVE

RELATED APPLICATIONS

This application claims priority of U.S. provisional application Ser. No. 60/314,387, filed Aug. 23, 2001.

FIELD OF THE INVENTION

This application relates generally to magnetic disc drive assemblies and more particularly to a crash stop assembly for a disc drive.

BACKGROUND OF THE INVENTION

Information is written to and read from tracks on disc drive discs through the use of a pivoting actuator assembly. The actuator assembly includes heads, which each move in close proximity above the corresponding surface of the associated disc. A voice coil motor controls the track position of the heads by pivoting the actuator assembly. The voice coil motor typically includes a coil attached to the actuator assembly, as well as one or more permanent magnets, which establish a magnetic field in which the coil is immersed. A bottom pole proximal the disc drive base plate and a top pole distal from the base plate typically establishes the magnetic field. The controlled application of current to the coil causes magnetic interaction between the permanent magnets and the coil so that the actuator assembly pivots.

Various approaches have been developed to securely position an actuator assembly in a disc drive during a loss of power event or shutdown of the drive such that the heads do not land on a portion of the disc real estate that contains data. Typically these approaches involve either positioning the actuator assembly onto a shelf to hold the heads away from the discs or positioning the heads over portions of the disc surfaces that contain no data, such as the landing zones of the discs. The landing zones typically contain no magnetic recorded information or alternatively contain only historical servo information that is not pertinent to drive operation if damaged by the heads actually contacting the surfaces of the discs in this location. Approaches for holding the arm assembly in such as "park" position include mechanical latches, electromechanical latches and magnetic latches.

To limit the range of motion of the actuator and heads under loss of power conditions and keep the heads in the landing zone, designers usually incorporate crash stops and a latch mechanism to position and hold the arm in the park position while the drive is without power. One concern in providing a latch and crash stop assembly is the level of energy absorbed by the crash stops. It is desirable that the crash stops absorb the impact of the actuator assembly as it stops without detrimentally affecting the head disc interface, even though the actuator assembly is designed to stop in a position away from the data region of the discs where the heads are parked. If excessive impact were to occur, the heads or the disc surface itself could be damaged by head slap. Consequently, crash stops may incorporate some type of rubber or polymeric cushion and limit impact deflection to keep the heads from moving out of the landing zone onto the data region of the disc. Often rubber cushions have not produced repeatable energy absorption characteristics because, for example, temperature changes can significantly alter the stiffness characteristics of the rubber material.

Typically, the installation of an actuator assembly in a disc drive having a voice coil motor includes three steps: (1) the bottom pole of the voice coil magnet is mounted adjacent the base plate, (2) the actuator itself is installed with the voice coil adjacent the bottom pole, and (3) the top pole of the voice coil magnet is installed with the top pole adjacent the voice coil. Typically between steps 2 and 3 the latch is not operational and the crash stops are not fully installed. For example, a magnetic latch that operates by using the magnetic flux from the voice coil magnet may be installed with the bottom pole of the voice coil magnet. However, until the top pole of the voice coil magnet is installed, the magnetic flux will not be channeled through the magnetic latch and the latch will not be operational. Additionally, crash stops are often installed with the top pole of the voice coil magnet, and thus the magnetic stops are often not functional between steps 2 and 3.

With the crash stops and the latch not being functional between steps 2 and 3, the actuator may pivot out of position, which may cause the recording head to contact the disc in a position other than the park position or to contact other parts of the disc drive. This may damage the disc or the recording head.

Accordingly, there is a need for an improved crash stop assembly. The present invention provides a solution to this and other problems, and offers other advantages over the prior art.

SUMMARY OF THE INVENTION

Against this backdrop the present invention has been developed. An embodiment of the present invention is a crash stop assembly for limiting pivotal movement of an actuator assembly mounted on a base plate of a disc drive. The disc drive includes a signal channel extending from the actuator assembly to a disc drive circuit board, and the crash stop assembly includes a connector bracket secured to the base plate and supporting the signal channel. The crash stop assembly further includes a crash stop secured to the connector bracket and extending therefrom, and the crash stop includes a contact surface that contacts the actuator assembly to limit pivotal movement of the actuator assembly. In a preferred embodiment, the crash stop preferably is integrally formed with the connector bracket. The crash stop may limit pivotal movement of the actuator assembly in a first direction and the crash stop assembly may further include a second crash stop secured to the connector bracket and extending therefrom.

Stated another way, an embodiment of the present invention is a disc drive including a disc rotatably mounted on a base plate, and a pivotally supported actuator assembly mounted adjacent the disc on the base plate, and a read/write channel extending from the actuator assembly to a disc drive circuit board. The disc drive further includes a crash stop assembly for limiting pivotal movement of the actuator assembly. The crash stop assembly includes a connector bracket secured to the base plate and supporting the signal channel. The crash stop assembly further includes a crash stop secured to the connector bracket. The crash stop includes a contact surface that contacts the actuator assembly to limit pivotal movement of the actuator assembly.

The present invention can further be implemented as a disc drive including an actuator assembly pivotally mounted to a base plate of the disc drive and means for limiting pivotal movement of the actuator assembly to a predetermined range. In a preferred embodiment, the disc drive includes a signal channel extending from the actuator assembly to a disc drive circuit board, and the means for limiting pivotal movement comprises means for supporting the signal channel.

These and various other features as well as advantages which characterize the present invention will be apparent from a reading of the following detailed description and a review of the associated drawings.

DETAILED DESCRIPTION

Figure 1:
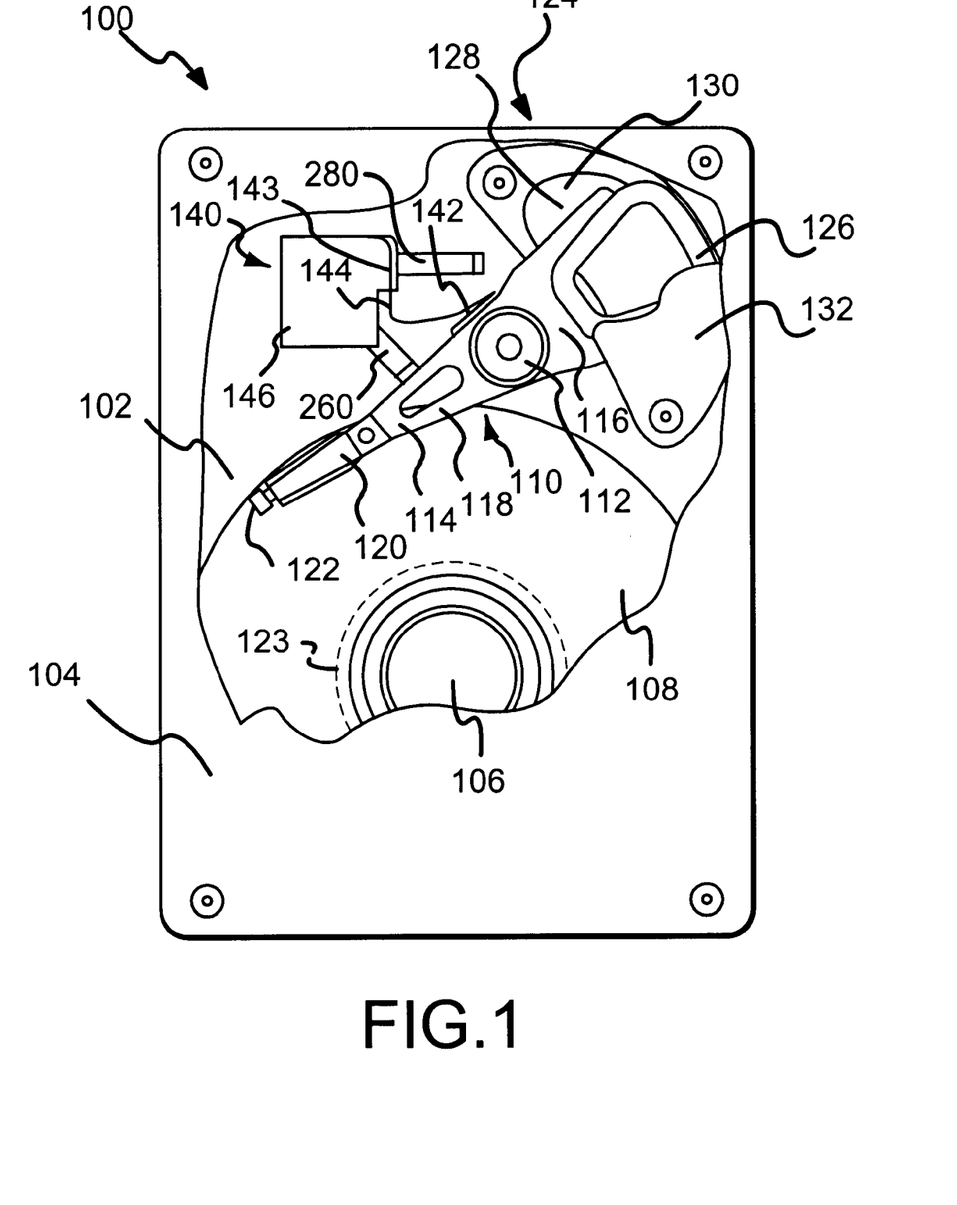
FIG. 1 is a partially broken away plan view of a disc drive incorporating an embodiment of the present invention showing the primary internal components.

Referring to FIG. 1, disc drive 100 includes a base plate 102 to which various components of the disc drive 100 are mounted. A top cover 104, shown partially cut away, cooperates with the base plate 102 to form an internal, sealed environment for the disc drive 100 in a conventional manner. The components include a spindle motor 106, which rotates one or more discs 108 at a constant high speed. Information is written to and read from tracks on the discs 108 through the use of an actuator assembly 110, which rotates during a seek operation about pivot or bearing shaft assembly 112 positioned adjacent the discs 108. The actuator assembly 110 includes a head aspect 114 extending forwardly from the pivot 112 and a motor aspect 116 extending rearwardly from the pivot 112. The head aspect 114 includes a plurality of actuator arms 118 which extend towards the discs 108, with one or more flexures 120 extending from each of the actuator arms 118. Mounted at the distal end of each of the flexures 120 is a head 122, which includes an air bearing slider enabling the head 122 to fly in close proximity above the corresponding surface of the associated disc 108.

During a seek operation, the track position of the heads 122 is controlled through the use of a voice coil motor 124, which typically includes a coil 126 attached to the motor aspect 116 of the actuator assembly 110, as well as one or more permanent magnets 128, which establish a magnetic field in which the coil 126 is immersed. The magnetic field is typically established by a bottom pole 130 proximal the base plate 102, which includes a permanent magnet 128, and a top pole 132, shown partially cut away, distal from the base plate 102, which also includes a permanent magnet 128. The controlled application of current to the coil 126 causes magnetic interaction between the permanent magnets 128 and the coil 126 so that the coil 126 moves in accordance with the well-known Lorentz relationship. As the coil 126 moves, the actuator assembly pivots about the bearing shaft assembly 112, and the heads 122 are caused to move across the surfaces of the discs 108.

The spindle motor 106 is typically de-energized when the disc drive 100 is not in use for extended periods of time. The heads 122 are moved over park zones or landing zones 123 near the inner diameter of the discs 108 when the drive motor is de-energized. The heads 122 are secured over the park zones 123 through the use of an actuator latch arrangement (not shown), which prevents inadvertent rotation of the actuator assembly 110 when the heads are parked.

A flex assembly and crash stop assembly 140 provides the requisite electrical connection paths for the actuator assembly 110 and limits pivotal movement of the actuator assembly 110 during operation. The flex assembly 140 includes a printed circuit board 142 to which head wires (not shown) are connected; the head wires being routed along the actuator arms 118 and the flexures 120 to the heads 122. The printed circuit board 142 typically includes circuitry for controlling the write currents applied to the heads 122 during a write operation and a preamplifier for amplifying read signals generated by the heads 122 during a read operation. The flex assembly 140 also includes channels 143 for communicating signals to and from the circuit board 142. The channels 143 include a flex cable 144 that extends from the circuit board 142 and is supported by a connector or flex bracket 146 for communication through the base plate 102 to a disc drive printed circuit board (not shown) mounted to the bottom side of the disc drive 100. Thus, the channels 143 extend from the actuator assembly 110 through the base plate 102.

Figure 2:
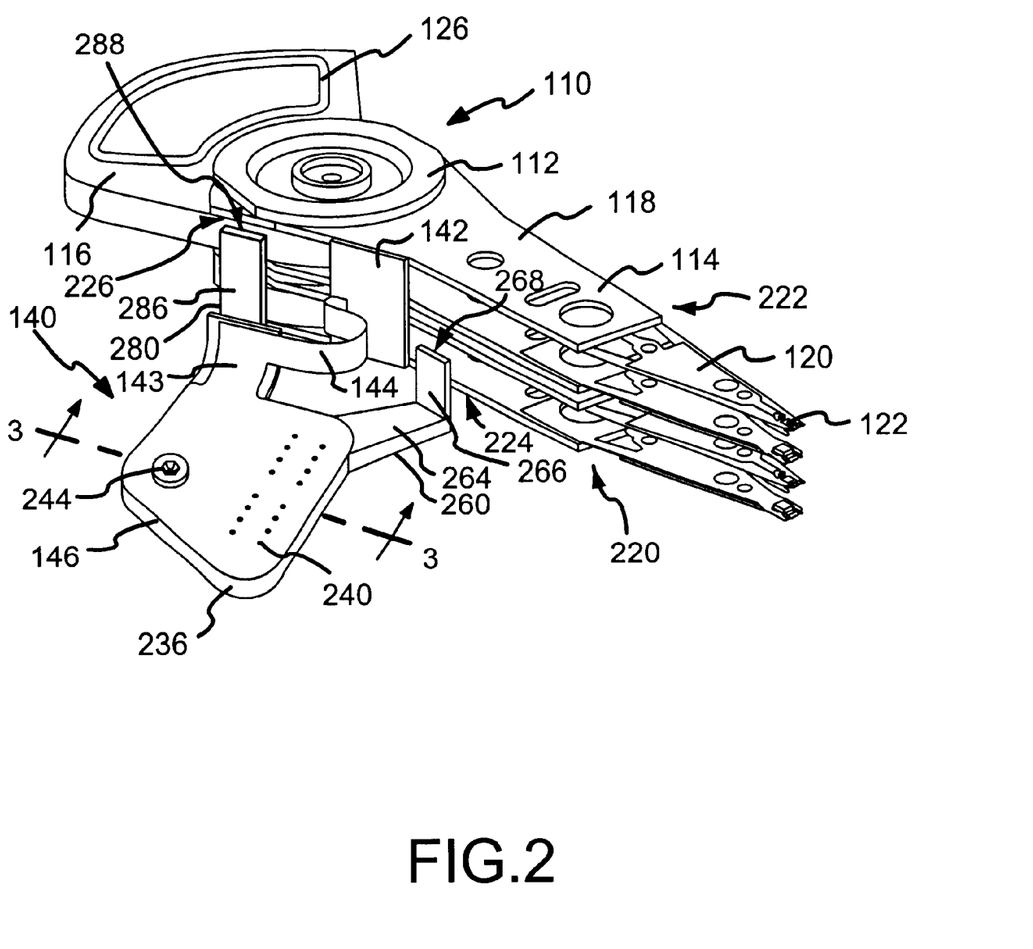
FIG. 2 is a perspective view of an actuator assembly and a crash stop assembly according to an embodiment of the present invention.

Referring now to FIG. 2 and describing the actuator assembly 110 and the crash stop assembly 140 in more detail, the actuator assembly 110 includes a first side 220 facing toward the connector bracket 146 and an opposing second side 222 facing away from the connector bracket 146. The actuator assembly 110 includes a head aspect contact surface 224 on the first side 220 of the head aspect 114. The head aspect contact surface 224 is preferably on one of the actuator arms 118, although it may be elsewhere on the head aspect 114 of the actuator assembly 110. If the actuator assembly 110 includes multiple actuator arms 118, then the head aspect contact surface 224 is preferably formed on the arm 118 that is proximal the base plate 102. The actuator assembly 110 also includes a motor aspect contact surface 226 on the first side 220 of the motor aspect 116.

Figure 3:
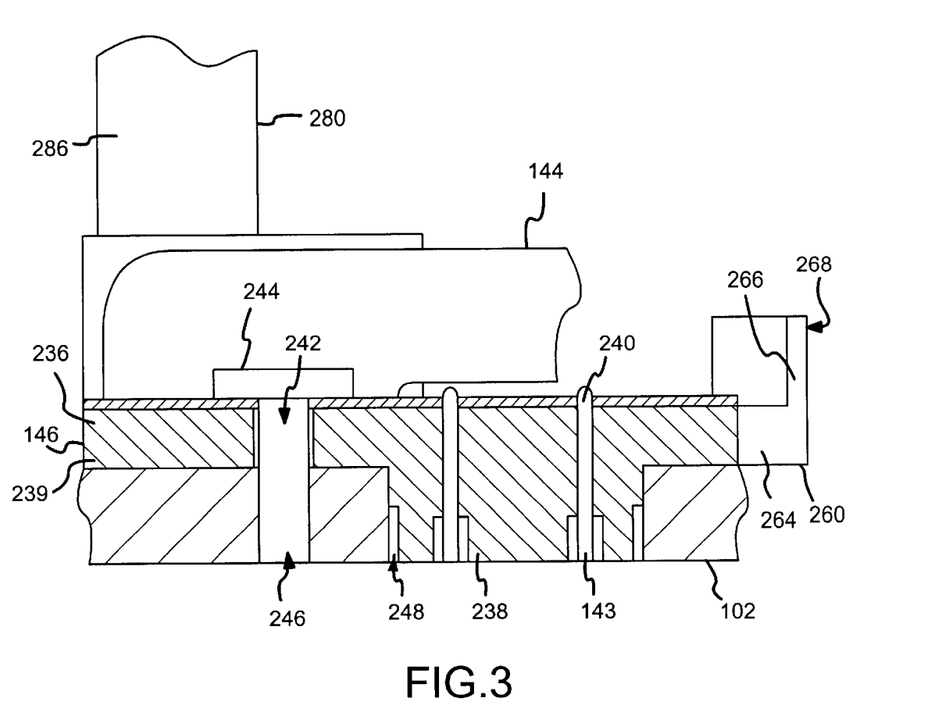
FIG. 3 is a partial sectional view of the crash stop assembly shown in FIG. 2 and a base plate taken along line 3—3 of FIG. 2.

Referring now to FIG. 3, the connector bracket 146 includes a polymer body 236 that includes a plug 238 and a flange 239 that flares outwardly from the plug 238. Electrically conductive pass-through pins 240 are part of the signal channels 143 and are electrically connected to the flex cable 144. The connector bracket 146 supports the flex cable 144 and the pass-through pins 240, and thus supports the signal channels 143. The pass-through pins 240 extend downwardly through the plug 238 and emerge on the opposite side of the connector bracket 146 to electrically connect the signal channels 143 to the disc drive circuit board (not shown). Thus, the signal channels 143 extend from the actuator assembly 110, pass through the base plate 102, and are supported by the connector bracket 146.

The connector bracket 146 also includes a hole 242 through the flange 239. A fastener 244 extends through the hole 242 and into a hole 246 in the base plate 102 where the fastener 244 engages the base plate 102, such as by threads, to secure the connector bracket 146 to the base plate 102. The plug 238 extends through a plug aperture 248 defined by the base plate 102.

In addition to the foregoing, the present invention encompasses embodiments wherein the connector bracket supports signal channels extending from the actuator assembly to the disc drive circuit board where the signals do not necessarily pass through the base plate. For example, the connector bracket could support the signal channels via a flex cable that passes between the top cover and the base plate to reach the disc drive circuit board.

Referring back to FIG. 2, a first or outside diameter crash stop 260 preferably includes an arm that is integrally formed with the polymer body 236 of the connector bracket 146. The outer crash stop 260 includes a first section 264 that extends from the connector bracket 146 in a direction that is substantially parallel to the base plate 102. A second section 266 extends from the terminus of the first section 264 substantially normal to and away from the base plate 102. The second section 266 has a contact surface 268 formed thereon that faces the first side 220 of the head aspect 114 of the actuator assembly 110. Preferably, the contact surface 268 is near the terminus of the second section 266 distal from the first section 264. The outer crash stop 260 is formed so that the contact surface 268 of the outer crash stop contacts the head aspect contact surface 224 when the heads 122 are pivoted to an outer circumference of the discs 108.

Figure 4:
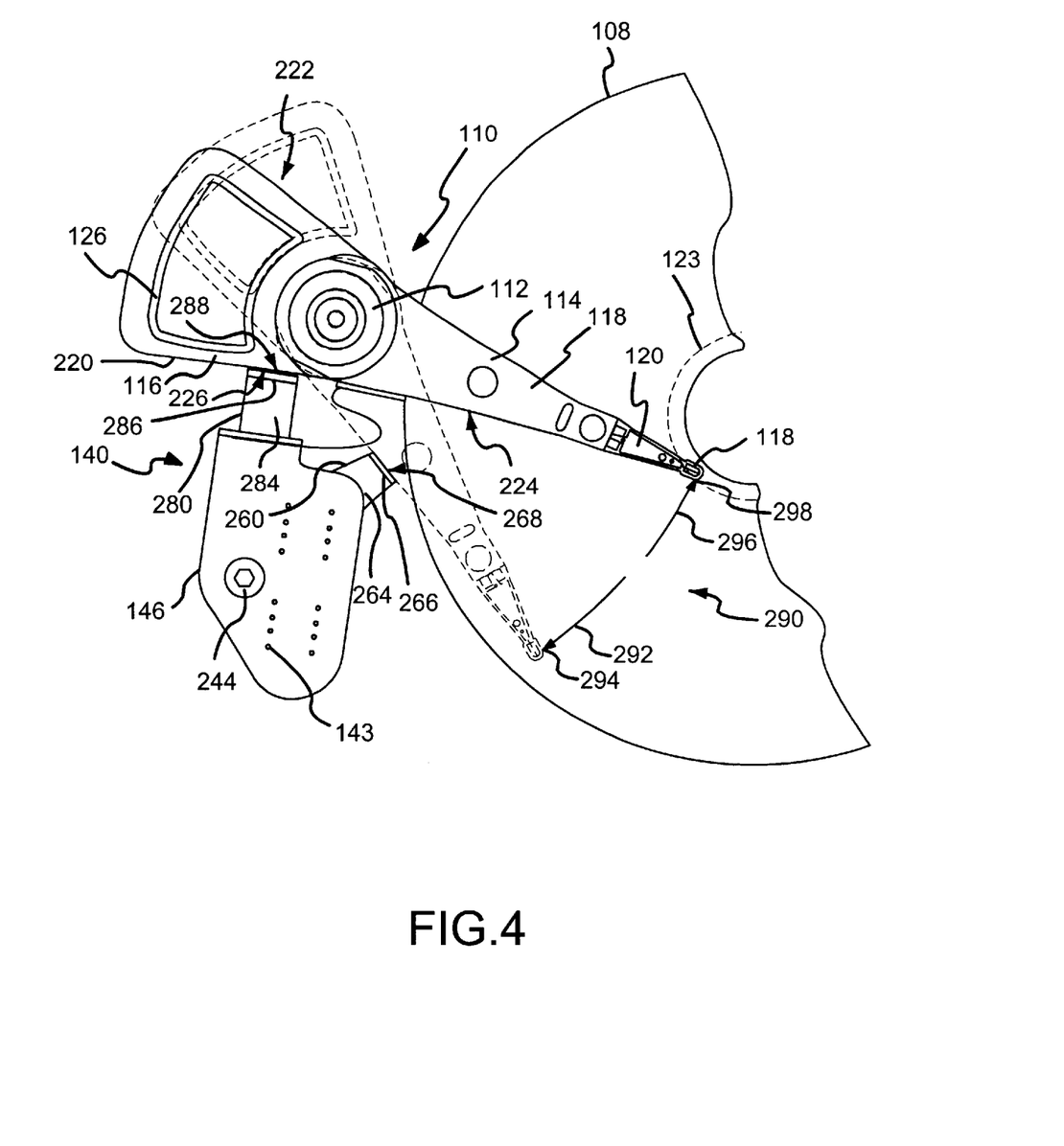
FIG. 4 is a plan view of the actuator assembly and crash stop assembly shown in FIG. 2 depicting the range of movement of the actuator assembly.

A second or inside diameter crash stop 280 preferably includes an arm that is integrally formed with the polymer body 236 of the connector bracket 146. The inner crash stop 280 includes a first section 284 (see FIG. 4) that extends from the connector bracket 146 in a direction that is substantially parallel to the base plate 102. A second section 286 extends from the terminus of the first section 284 (see FIG. 4) substantially normal to and away from the base plate 102. The second section 286 has a contact surface 288 formed thereon that faces the first side 220 of the motor aspect 116 of the actuator assembly 110. Preferably, the contact surface 288 is near the terminus of the second section 286 that is distal from the first section 284. The inner contacts the motor aspect contact surface 226 when the motor aspect heads 118 are pivoted to an inner circumference of the discs 108. Referring now to FIG. 4, the crash stop assembly 140 limits the pivotal movement of the actuator assembly 110 to a specific range 290. Within the range 290, the actuator assembly 110 can pivot in a first direction 292 to an outside diameter limit 294 (wherein the actuator assembly 110 is shown in dashed lines) defined by the outer crash stop 260. The actuator assembly 110 can pivot in a second direction 296 to an inside diameter limit 298 (wherein the actuator assembly is shown in solid lines) defined by the inner crash stop 280. At the inside diameter limit 298 the head 122 is within the landing zone 123, and at the outside diameter limit 294 the head 122 is at its outermost radial position on the disc 108. More specifically, when the actuator assembly 110 pivots to the inside diameter limit 298, the motor aspect contact surface 226 of the motor aspect 116 contacts the contact surface 288 of the inner crash stop 280 to prevent further pivotal movement of the actuator assembly 110. Likewise, when the actuator assembly 110 pivots to the outside diameter limit 294, the head aspect contact surface 224 of the head aspect 114 contacts the contact surface 268 of the outer crash stop 260 to prevent further pivotal movement of the actuator assembly 110. Thus, the crash stop assembly 140 limits the pivotal movement of the actuator assembly 110 to keep the head 122 within the predetermined range 290 on the disc 108.

Referring back to FIG. 2, the crash stops 260, 280 are preferably integrally formed with the polymer body 236 of the connector bracket 146. The crash stops 260, 280 and the polymer body 236 may be comprised of any material with suitable strength and stiffness characteristics. Preferably, the crash stops 260, 280 and the polymer body 236 are comprised of a polymer material that has the requisite stiffness and strength while being inexpensive to manufacture. Moreover, the crash stop material preferably has stable and reliable stiffness and strength characteristics. In a preferred embodiment, the material is polycarbonate.

The crash stops 260, 280 and the polymer body 236 are preferably manufactured by a molding process because dimensional tolerances may be tightly controlled for a polymer-molded part, such as a polycarbonate molded part. This is in distinction to the dimensional tolerances of rubber parts that have been used for many prior crash stops and even many stamped steel parts that have also been used for prior crash stops. For example, in one prior embodiment using a stamped steel crash stop, the tolerance of the stamped steel part can be controlled to approximately plus or minus 0.005 inch. The tolerance of current plastic molding can typically be as low as approximately plus or minus 0.002 inch and in some cases as low as approximately plus or minus 0.0005 inch. Many connector brackets are already formed by such polymer molding processes. Thus, the crash stops 260, 280 can be effectively formed using existing processes by merely using new molds.

Referring back to FIG. 1, the actuator assembly 110 and the flex assembly and crash stop assembly 140 can be assembled according to existing assembly processes. In such a process, the bottom pole 130 of the voice coil motor 124 is first installed. Second, the actuator assembly 110 and the flex assembly and crash stop assembly 140 are mounted on the base plate 102. Third, the top pole 132 of the voice coil motor 124 is mounted above the motor aspect 116 of the actuator assembly 110. Because the crash stop assembly 140 is assembled and mounted in the same manufacturing step as the actuator assembly 110, the actuator assembly 110 is not freely pivotable between the second and third steps. Additionally, the biasing force of the flex cable 144 on the actuator assembly 110 will tend to bias the actuator assembly against one of the crash stops 260, 280 to prevent the actuator assembly 110 from even moving through the limited range of motion 290. Thus, the crash stops 260, 280 and the flex cable 144 together act as a temporary latch during manufacturing, preventing undesirable pivotal movement of the actuator assembly 110 even before the top pole 132 of the voice coil magnet 128 is installed. Additionally, by having the crash stops 260, 280 extend from the connector bracket 146, the multiple parts associated with prior crash stops may be omitted from the disc drive 100, thereby simplifying the disc drive 100 and decreasing material and manufacturing costs.

The crash stops 260, 280 as described above do not incorporate a permanent latch mechanism. The disc drive 100 can use one of the many types of existing latches, such as mechanical, electromechanical, or magnetic latches, in addition to the crash stop assembly 140.

It is desirable to produce a crash stop that is sufficiently elastic so that the actuator assembly 110 does not stop too abruptly, thereby damaging components of the disc drive 100. However, the crash stops 260, 280 should be sufficiently strong so that they will not fail after repeated impacts with the pivoting actuator assembly 110. Additionally, some drives use dynamic unparking technology and may not unpark (i.e., move the actuator assembly 110 out of the parked position) if the crash stops 260, 280 are not sufficiently stiff. Accordingly, the stiffness of the crash stops 260, 280 is preferably accurately controlled.

Figure 5:
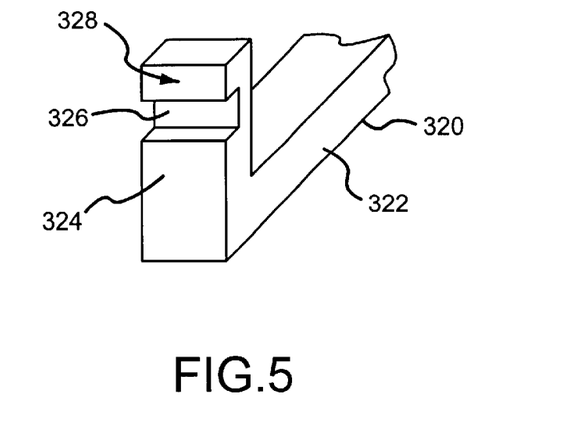
FIG. 5 is a perspective view of a crash stop according to an alternative embodiment of the present invention.
Figure 6:
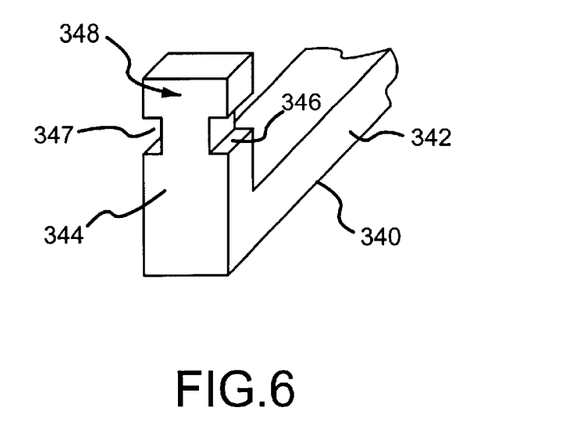
FIG. 6 is a perspective view of a crash stop according to an alternative embodiment of the present invention.
Figure 7:
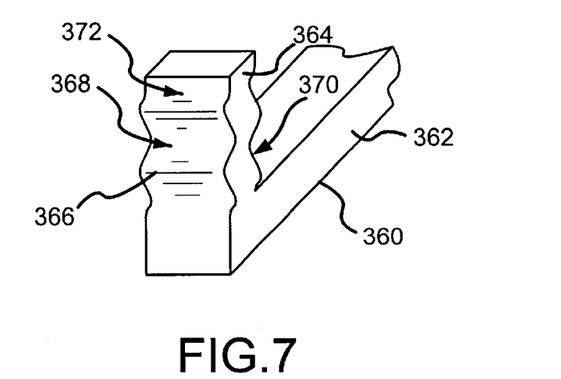
FIG. 7 is a perspective view of a crash stop according to an alternative embodiment of the present invention.

FIGS. 5–7 depict alternative embodiments of crash stops that may be used to reduce the stiffness from what such crash stops would have had with constant rectangular cross sectional arms such as are shown in FIG. 2. Such crash stops are preferably integrally formed with the polymer body 236 of the connector bracket 146 as described above. Such crash stops can be used for both or either of the crash stops described above, and the dimensions of the crash stops can be varied to produce the desired stiffness as described above. Preferably, the dimensions are such that the strength and endurance of the crash stops is maximized for the desired level of stiffness. The characteristics of the crash stops can be estimated by finite element modeling (FEM) software during design, and they can be further tested after prototypes of particular designs are produced. Those skilled in the art will also recognize that many other alternative embodiments of the crash stops are possible Referring now to FIG. 5, a crash stop 320 includes a first section 322 with a constant rectangular cross section. A second section 324 extends normal to the first section 322. The second section 324 defines a rectangular cutout 326 facing away from the first section 322, which cutout 326 reduces the stiffness of the crash stop 320. The second section 324 also has a contact surface 328 formed thereon. The dimensions of the crash stop 320 and particularly the dimensions of the cutout 326 can be varied to produce desired stiffness, strength, and endurance characteristics.

Referring now to FIG. 6, a crash stop 340 includes a first section 342 and a second section 344 extending normal to the first section 342. The second section 344 defines a pair of opposing lateral cutouts 346, 347 extending laterally inwardly from opposing sides of the second section 344 so that the second section 344 is substantially I-shaped. The second section 344 also has a contact surface 348 formed thereon facing away from the first section 342. The cutouts 346, 347 reduce the stiffness of the crash stop 340. The dimensions of the crash stop 340 and particularly the dimensions of the cutouts 346, 347 can be varied to produce desired stiffness, strength, and endurance characteristics.

FIG. 7 depicts an alternative embodiment of a crash stop 360 having a first section 362 and a second section 364 extending substantially normal to the first section 362. The second section 364 includes a wavy or curved section 366 that alternately curves toward and away from the first section 362 and defines a pair of opposing curved surfaces 368, 370. The second section 364 also includes a contact surface 372. The wavy section 366 reduces the stiffness of the crash stop 360. The dimensions of the crash stop 360 and particularly the dimensions, including the curvature, of the wavy section 366 can be varied to produce desired stiffness, strength, and endurance characteristics.

In summary, an embodiment of the present invention is a crash stop assembly (such as 140) for limiting pivotal movement of an actuator assembly (such as 110) mounted on a base plate (such as 102) of a disc drive (such as 100). The disc drive (such as 100) includes a signal channel (such as 143) extending from the actuator assembly (such as 110) to a disc drive circuit board, and the crash stop assembly (such as 140) includes a connector bracket (such as 146) secured to the base plate (such as 102) and supporting the signal channel (such as 143). The crash stop assembly (such as 140) further includes a crash stop (such as 260, 280, 320, 340, or 360) secured to the connector bracket (such as 146) and extending therefrom, and the crash stop (such as 260, 280, 320, 340, or 360) includes a contact surface (such as 268, 288, 328, 348, or 372) that contacts the actuator assembly (such as 110) to limit pivotal movement of the actuator assembly (such as 110).

In a preferred embodiment, the connector bracket (such as 146) spans an aperture (such as 248) in the base plate (such as 102) and the connector bracket (such as 146) passes the signal channel (such as 143) through the aperture (such as 248). Preferably, the crash stop (such as 260, 280, 320, 340, or 360) is integrally formed with the connector bracket (such as 146) and is composed of a molded polymer material. Also, the crash stop (such as 260, 280, 320, 340, or 360) is preferably an arm extending from the connector bracket (such as 146) that includes a first section (such as 264, 284, 322, 342, or 362) extending from the connector bracket (such as 146) in a direction substantially parallel to the base plate (such as 102) and a second section (such as 266, 286, 324, 344, or 364) extending from the first section (such as 264, 284, 322, 342, or 362) away from the base plate (such as 102) and defining the contact surface (such as 268, 288, 328, 348, or 372). The second section (such as 266, 286, 324, 344, or 364) may define a cutout (such as 326, 346, or 347) therein or it may define a curved surface (such as 368 or 370).

The crash stop (such as 260) may limit pivotal movement of the actuator assembly (such as 110) in a first direction (such as 292) and the crash stop assembly (such as 140) may further include a second crash stop (such as 280) secured to the connector bracket (such as 146) and extending therefrom. The second crash stop (such as 280) includes a second contact surface (such as 288) that contacts the actuator assembly (such as 110) to limit pivotal movement of the actuator assembly (such as 110) in a second direction (such as 296) opposite the first direction (such as 292). In a preferred embodiment, both the first aforesaid (such as 260) and the second (such as 280) crash stops are formed integrally with the connector bracket (such as 146).

Stated another way, an embodiment of the present invention is a disc drive (such as 100) including a disc (such as 108) rotatably mounted on a base plate (such as 102), and a pivotally supported actuator assembly (such as 110) mounted adjacent the disc (such as 108) on the base plate (such as 102), and a read/write channel (such as 143) extending from the actuator assembly (such as 110) to a disc drive circuit board. The disc drive (such as 100) further includes a crash stop assembly (such as 140) for limiting pivotal movement of the actuator assembly (such as 110). The crash stop assembly (such as 140) includes a connector bracket (such as 146) secured to the base plate (such as 102) and supporting the signal channel (such as 143) and a crash stop (such as 260, 280, 320, 340, or 360) secured to the connector bracket (such as 146) and including a contact surface (such as 268, 288, 328, 348, or 372) that contacts the actuator assembly (such as 110) to limit pivotal movement of the actuator assembly (such as 110).

In a preferred embodiment, the actuator assembly (such as 110) includes a pivot (such as 112), a head aspect (such as 114) extending forwardly from the pivot (such as 112) and carrying a read/write head (such as 122) thereon, and an opposing motor aspect (such as 116) extending rearwardly from the pivot (such as 112) and carrying a voice coil (such as 126) thereon. The contact surface (such as 268) of the crash stop (such as 260) contacts the head aspect (such as 114) of the actuator assembly (such as 110) to define a first limit (such as 294) of a predetermined range of movement (such as 290) of the actuator assembly (such as 110). The crash stop assembly (such as 140) further includes a second crash stop (such as 280) secured to the connector bracket (such as 146) and including a second contact surface (such as 288) that contacts the motor aspect (such as 116) of the actuator assembly (such as 110) to define a second limit (such as 298) of the predetermined range of movement (such as 290).

Preferably, the first aforesaid crash stop (such as 260) and the second crash stop (such as 280) each includes a first section (such as 264 and 284) extending from the connector bracket in a direction substantially parallel to the base plate (such as 102) and a second section (such as 266 and 286) extending substantially normal to the first section (such as 264 and 284) and away from the base plate (such as 102).

Stated yet another way, an embodiment of the present invention is a disc drive (such as 100) including an actuator assembly (such as 110) pivotally mounted to a base plate (such as 102) of the disc drive (such as 100) and means (such as 140) for limiting pivotal movement of the actuator assembly (such as 110) to a predetermined range (such as 290). In a preferred embodiment, the disc drive (such as 100) includes a signal channel (such as 143) extending from the actuator assembly (such as 110) to a disc drive circuit board, and the means (such as 140) for limiting pivotal movement comprises means (such as 146) for supporting the signal channel (such as 143).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, one of the crash stops may incorporate a latch, such as a magnetic latch. Such a magnetic latch could be formed by mounting a permanent magnet on one of the crash stops, wherein the magnet would define the contact surface. Numerous other changes may be made which will readily suggest themselves to those skilled in the art and which are encompassed in the spirit of the invention disclosed and as defined in the appended claims.

What is claimed is:

1. A crash stop assembly for limiting pivotal movement of an actuator assembly mounted on a base plate of a disc drive, the disc drive including a signal channel extending from the actuator assembly to a disc drive circuit board, the crash stop assembly comprising:
    a connector bracket secured to the base plate and supporting the signal channel; and
    a crash stop secured to the connector bracket and extending therefrom, the crash stop including a contact surface that contacts the actuator assembly to limit pivotal movement of the actuator assembly.

2. The crash stop assembly of claim 1, wherein the connector bracket spans an aperture in the base plate and the connector bracket passes the signal channel through the aperture.

3. The crash stop assembly of claim 1, wherein the crash stop is integrally formed with the connector bracket.

4. The crash stop assembly of claim 3, wherein the crash stop is composed of a polymer material.

5. The crash stop assembly of claim 4, wherein the polymer material is molded.

6. The crash stop assembly of claim 1, wherein the crash stop is an arm extending from the connector bracket.

7. The crash stop assembly of claim 6, wherein the crash stop includes a first section extending from the connector bracket in a direction substantially parallel to the base plate and a second section extending from the first section away from the base plate and defining the contact surface.

8. The crash stop assembly of claim 7, wherein the second section defines a cutout therein.

9. The crash stop assembly of claim 7, wherein the second section defines a curved surface.

10. The crash stop assembly of claim 1, wherein:
    the crash stop limits pivotal movement of the actuator assembly in a first direction; and
    the crash stop assembly further comprises a second crash stop secured to the connector bracket and extending therefrom, the second crash stop including a second contact surface that contacts the actuator assembly to limit pivotal movement of the actuator assembly in a second direction opposite the first direction.

11. The crash stop assembly of claim 10, wherein both the first aforesaid and the second crash stops are formed integrally with the connector bracket.

12. A disc drive including a disc rotatably mounted on a base plate, and a pivotally supported actuator assembly mounted adjacent the disc on the base plate, and a signal channel extending from the actuator assembly to a disc drive circuit board, the disc drive further including a crash stop assembly for limiting pivotal movement of the actuator assembly, the crash stop assembly comprising:
    a connector bracket secured to the base plate and supporting the signal channel; and
    a crash stop secured to the connector bracket and including a contact surface that contacts the actuator assembly to limit pivotal movement of the actuator assembly.

13. The disc drive of claim 12, wherein the connector bracket spans an aperture in the base plate and the connector bracket passes the signal channel through the aperture.

14. The disc drive of claim 12, wherein:
    the actuator assembly includes a pivot, a head aspect extending forwardly from the pivot and carrying a read/write head thereon, and an opposing motor aspect extending rearwardly from the pivot and carrying a voice coil thereon;
    the contact surface of the crash stop contacts the head aspect of the actuator assembly to define a first limit of a predetermined range of movement of the actuator assembly; and
    the crash stop assembly further includes a second crash stop secured to the connector bracket and including a second contact surface that contacts the motor aspect of the actuator assembly to define a second limit of the predetermined range of movement.

15. The disc drive of claim 14, wherein both the first aforesaid crash stop and the second crash stop are integral with the connector bracket.

16. The disc drive of claim 15, wherein the connector bracket, the first crash stop, and the second crash stop are composed of a molded polymer material.

17. The disc drive of claim 14, wherein the first aforesaid crash stop and the second crash stop each include a first section extending from the connector bracket in a direction substantially parallel to the base plate and a second section extending substantially normal to the first section and away from the base plate.

18. The disc drive of claim 17, wherein the second sections of both the first and second crash stops each define a cutout therein that opens away from the respective first section of the first and second crash stops.

19. The disc drive of claim 17, wherein the second sections of both the first and second crash stops each define a pair of opposing cutouts therein that extend transversely inwardly.

20. The disc drive of claim 17, wherein the second sections of both the first and second crash stops each include a curved surface.

21. A disc drive comprising:
    an actuator assembly pivotally mounted to a base plate of the disc drive; and
    means for limiting pivotal movement of the actuator assembly to a predetermined range.

22. The disc drive of claim 21, wherein the disc drive includes a signal channel extending from the actuator assembly to a disc drive circuit board and wherein the means for limiting pivotal movement comprises means for supporting the signal channel.

* * * * *

UNITED STATES PATENT AND TRADEMARK OFFICE
CERTIFICATE OF CORRECTION

PATENT NO. : 6,628,482 B2
DATED : September 30, 2003
INVENTOR(S) : Hong et al.

It is certified that error appears in the above-identified patent and that said Letters Patent is hereby corrected as shown below:

Column 5,
Line 34, after "inner" insert -- crash stop 280 is preferably formed so that the contact surface 288 of the inner crash stop --

Signed and Sealed this

Ninth Day of March, 2004

JON W. DUDAS
*Acting Director of the United States Patent and Trademark Office*